No. 659,001. Patented Oct. 2, 1900.
N. STAFFORD.
NUT LOCK.
(Application filed Apr. 16, 1900.)
(No Model.)
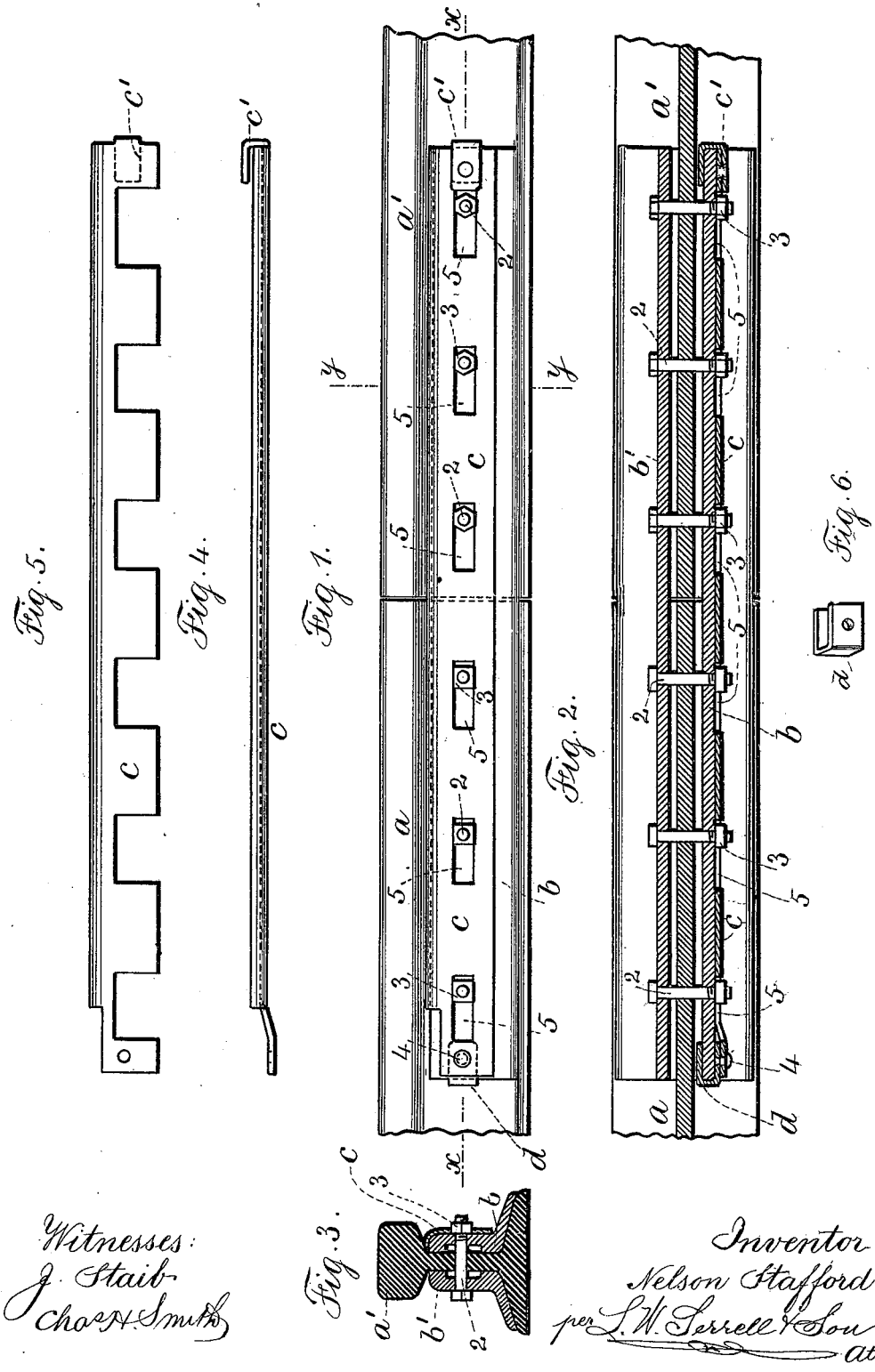

United States Patent Office.

NELSON STAFFORD, OF NEW YORK, N. Y.

NUT-LOCK.

SPECIFICATION forming part of Letters Patent No. 659,001, dated October 2, 1900.

Application filed April 16, 1900. Serial No. 13,028. (No model.)

*To all whom it may concern:*

Be it known that I, NELSON STAFFORD, a citizen of the United States, residing in the city of New York, borough of Brooklyn, in the county of Kings and State of New York, have invented a new and useful Improvement in Nut-Locks, of which the following is a specification.

My invention relates to a lock-plate having holes to receive the nuts of the bolts connecting the fish-plates at the meeting ends of railway-rails, the object being to prevent the nuts turning and working loose. Heretofore these lock-plates have been provided with integral tang ends bent and passed in behind the ends of the fish-plates; but on account of the very small space between the fish-plate and the rail it was difficult to form a bend of sufficient length to hold firmly, and the same were liable to loosen and work out of shape; and the object of my invention is to overcome these difficulties.

In carrying out my invention I provide the lock-plates, having holes to receive the nuts of the bolts, preferably with a curved upper edge conforming to the shape of the fish-plate at its upper edge, whereby the plate is kept true and an upward movement prevented, and thereby stiffening the lock-plate and tending to keep out dirt and dust between the fish-plate and rail; but the lock-plates may be made flat or with both their upper and lower edges curved. One end of the lock-plate is provided with a tang bent to pass around one end of the fish-plate, and there is a perforation in the other end of the lock-plate, and I employ a yoke-plate adapted to be connected to the perforated end of the lock-plate by a rivet-pin or equivalent device. This yoke-plate is passed over the opposite end of the fish-plate, and a pin or rivet is passed through a perforation in the yoke-plate and through the perforation in the end of the lock-plate to connect and lock the parts together, the said pin or rivet either being upset or bent over for that purpose. It will be obvious that the rivet-pin may be made integral with the yoke-plate, if desired.

In the drawings, Figure 1 is an elevation representing my improvement. Fig. 2 is a longitudinal section at $x\ x$ of Fig. 1. Fig. 3 is a cross-section at $y\ y$ of Fig. 1, and Fig. 4 is a plan view of the lock-plate. Fig. 5 is an elevation showing a modified form, and Fig. 6 is a perspective view of the yoke-plate alone.

The rails $a\ a'$ and the fish-plates $b\ b'$, the bolts 2, passing through the fish-plates, and the rails and the nuts 3 upon the ends of the bolts are all of usual construction and do not require further description.

The lock-plate $c$ is of approximately the length of the fish-plate, and the same is provided with holes 5 at intervals corresponding with the position of the nuts 3, the said holes passing over and receiving the said nuts regardless of whether the nuts are square or hexagonal, the slots being of a length and so placed as to accommodate the positions of the various bolts.

One end of the lock-plate $c$ (shown in the drawings at the right-hand end) is provided with a tang $c'$. This tang, as shown in Figs. 1 and 2, may be a separate piece riveted to the plate or, as shown in Figs. 4 and 5, an integral portion. In any event the tang is bent so as to pass around one end of the fish-plate and connect the plate to the surface of the fish-plate and prevent a longitudinal movement of the plate toward the left-hand side. The other end of the lock-plate at the left hand is provided with one or more perforations, and I employ the yoke-plate $d$, adapted to pass over or straddle the end of the fish-plate, and the yoke-plate is provided with a pin 4, projecting from the surface thereof or with a perforation through which a pin or rivet may be passed. In connecting the lock-plate $c$ in place and holding and preventing the nuts from accidentally turning the tang $c'$ is slipped over the end of the fish-plate, the lock-plate $c$ passed over the nuts, the yoke-plate $d$ meanwhile being slipped over the other end of the fish-plate, and the pin or rivet 4 is then inserted and either riveted up or bent to one side to connect the lock-plate and the yoke-plate, so that the plate is held in position.

The upper edge of the lock-plate $c$ is preferably curved to conform to the upper edge of the fish-plate and to pass in under the tread of the rail. This curved upper edge to the plate $c$ stiffens the same and prevents the plate accidentally getting out of shape and when in position prevents the accidental upward movement of the said plate. This curved edge performs this latter function in connection with the plate c, as will be seen by reference to Fig. 5, in which construction the lower edge of the plate may be simply notched to receive the nuts instead of the plate being provided with holes or mortises.

The form shown in Figs. 1 and 2 is preferable, because therein two edges of the plate $c$ abut against two opposite edges of the nuts 3, while with the construction shown in Fig. 5 there would only be one edge of the plate contacting with one edge of the nuts to prevent the same accidentally turning and loosening.

Where the tang $c'$ is made of a separate piece from the lock-plate $c$ and riveted or otherwise secured thereto, it permits of the tang being made of thicker or heavier metal than the lock-plate.

The nut-holes in the lock-plate being elongated permit the easy placing of the tang $c'$ around one end of the fish-plate and the fitting of the lock-plate in the desired position over the nuts before the yoke-plate at the opposite end is put in position and secured to the lock-plate.

I claim as my invention—

1. A nut-lock comprising a plate having openings to receive the nuts and a curved upper edge, a tang at one end bent to engage one end of the fish-plate and the other end of said plate provided with a perforation and a yoke-plate adapted to engage the opposite end of the fish-plate and having a projecting pin to pass into the perforation in the end of the lock-plate and engage the same, substantially as set forth.

2. A nut-lock comprising a plate of approximately the length of the fish-plate connection having spaced-apart holes or mortises to receive the nuts, a curved upper edge conforming to the fish-plate and coming beneath the tread of the rail, a tang at one end bent to pass around the end of the fish-plate and the opposite end provided with a perforation, a yoke-plate adapted to pass over or straddle the opposite end of the fish-plate and having a projecting pin to pass through the perforation in the end of the plate and to be riveted or otherwise connected thereto in securing the parts, substantially as set forth.

3. A nut-lock comprising a plate having openings to receive the nuts, a tang at one end bent to engage one end of the fish-plate and the other end of said plate provided with a perforation, a yoke-plate adapted to straddle and engage the opposite end of the fish-plate, and a pin for connecting the yoke-plate and the plate with openings at its end perforation, substantially as set forth.

4. A nut-lock comprising a plate of approximately the length of the fish-plate connection having spaced-apart holes or mortises to receive the nuts, and a perforation in one end, a tang at the other end bent to pass around one end of the fish-plate, a yoke-plate adapted to pass over or straddle the opposite end of the fish-plate and having a projecting pin to pass through the perforation in the end of the lock-plate and to be riveted or otherwise connected thereto in securing the parts, substantially as set forth.

Signed by me this 12th day of April, 1900.

N. STAFFORD.

Witnesses:
GEO. T. PINCKNEY,
S. T. HAVILAND.